Dec. 26, 1961      J. F. McHUGH      3,015,052

CAPACITOR CONSTRUCTION

Filed Aug. 18, 1958

*INVENTOR.*
JAMES F. McHUGH
BY Robert E. Isner
ATTORNEY

United States Patent Office 3,015,052
Patented Dec. 26, 1961

3,015,052
CAPACITOR CONSTRUCTION
James F. McHugh, Marion, Mass., assignor to Cornell-Dubilier Electric Corporation, South Plainfield, N.J., a corporation of Delaware
Filed Aug. 18, 1958, Ser. No. 755,702
2 Claims. (Cl. 317—261)

This invention relates to electrical capacitors and particularly to an improved construction for electrical capacitors formed of a rectangularly shaped stack of interleaved conducting and dielectric elements of planar character.

Recent years have witnessed a continuing demand for small sized inexpensive electrical capacitors, for example, for feed through and bypass purposes. Capacitors of the requisite size and cost may readily be fabricated and may include, for example, a pair of conducting electrode elements, a conducting casing of the wrap-around type and a plurality of dielectric sheets, suitably mica, to separate the electrode elements from each other and if desired, from said conducting casing with cost requirements preventing utilization of an insulating protection casing.

In such type of unit, the interleaving dielectric sheets are usually made somewhat larger in planar extent than the electrode surfaces and the casing element in order to lineally extend the interelectrode arc over distances. This dimensional requirement, coupled with the cost requirements mentioned above, has resulted in an undue number of unsatisfactory units occasioned by the breakage of the extending portions of the dielectric sheets, and particularly the corner portions thereof, during shipment or in normal handling operations attendant usage thereof.

This invention may be briefly described as an improved construction for capacitors of the above type which includes means to minimize, if not actually eliminate, the hazards of dielectric breakage without noticeably increasing the cost of the finished units.

The object of this invention is an improved construction for capacitors.

Another object of this invention is the provision of an improved construction for rectangularly shaped stacked capacitors to minimize, if not actually eliminate, breakage of the extending portions of the interleaving sheet type dielectric media.

Other objects and advantages of the invention will be pointed out in the following disclosure and claims and illustrated in the accompanying drawings, which show, by way of example, the principles of the invention together with a presently preferred embodiment incorporating these principles.

Referring to the drawings.

Figure 1:
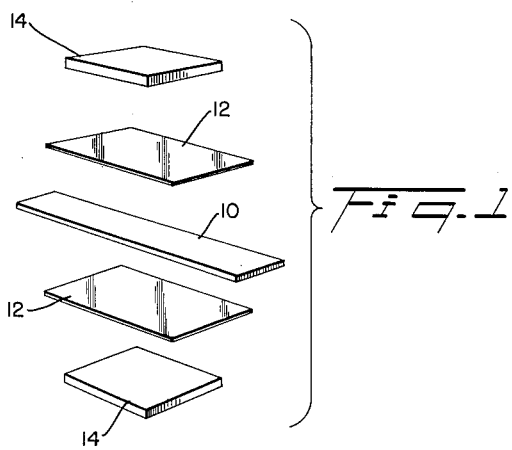
FIG. 1 is an exploded oblique view of the capacitor elements includable in the type of capacitor here of concern.

Referring to the drawings and in particular to FIG. 1 thereof, which is schematically illustrative of the elements included in the general type of capacitors here of concern, there is provided a rectangularly shaped stack type capacitor unit which, in the illustrated embodiment, includes a centrally disposed relatively narrow elongate thin strip of conducting metal 10, a portion of which serves as one electrode element of an assembled capacitor. Disposed on either side thereof are thin rectangular planar sheets of frangible dielectric material 12, suitably mica.

Figure 3:
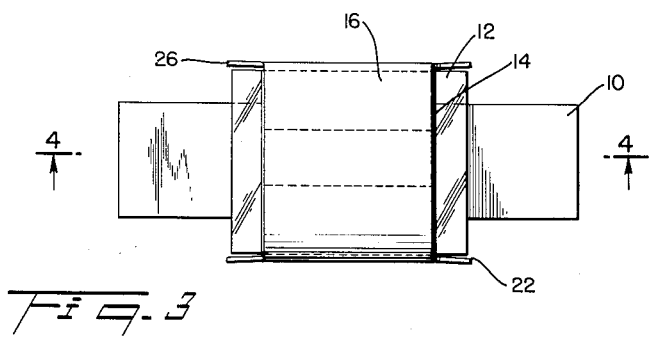
FIG. 3 is a plan view of an assembled capacitor incorporating the principles of this invention.

The dielectric sheets 12 are preferably sized so that the width thereof is appreciably greater than the width of the strip 10 as best shown in FIG. 3. Disposed on either side of the dieelectric sheets 12 are thin metal plate type electrode elements 14 of a length slightly less than that of the dielectric sheets 12.

Figure 2:
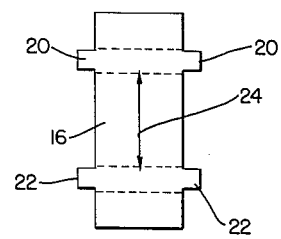
FIG. 2 is a plan view of the preferred configuration of the wrap-around type of casing element, prior to deformation thereof, incorporating the principles of this invention.
Figure 4:
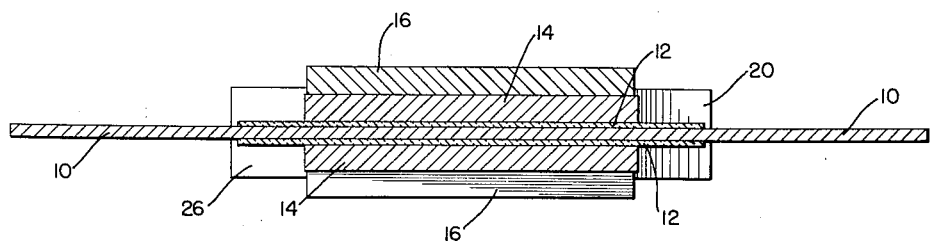
FIG. 4 is a section on the line 4—4 of FIGURE 3.

The above described elements are adapted to be disposed in planar stack relationship and to be compressibly maintained in such relationship by an elongate conducting casing member 16 of the general character illustrated in FIG. 2, and wrapped there around as generally illustrated in FIGS. 3 and 4. The conducting casing member 16 is of a length sufficient to wrap around the above identified stack of electrode and dielectric elements transversely to the longitudinal dimension of the strip 10 and is preferably of a width closely approximating the length of the plate type electrode members 14. As shown in the assembled unit, the end portions of the dielectric sheets 12 are sized to extend beyond the ends of the plate members 14 so as to lineally extend the inter-electrode arc over distance. This necessary extension of the dielectric sheets 12 results in a consequent exposure of the same and renders said exposed portions liable to breakage, particularly at the corner portions thereof with its attending lessening of the inter-electrode arc over distances at each such location.

Minimization, if not actual elimination, of breakage of the extending portions of the dielectrics 12, in capacitors of the above described general character may be inexpensively attained by employment of a wrap around type of casing member of the general configuration shown in FIG. 2. As there illustrated, the conducting casing member 16 is provided with two pairs of transversely extending or projecting lugs or ears 20, 22 selectively spaced apart a predetermined distance 24 that is sufficient to result in disposition of the same adjacent with and substantially parallel to the side portion of said stack of capacitor elements when said casing member 16 is compressibly wrapped there around. The projecting lugs 20, 22 are each sized to longitudinally extend, when the casing member 16 is compressibly wrapped around the stack, a distance equal to or slightly greater than the longitudinal extent of the dielectric sheets 12 as illustrated at 26 in FIGS. 3 and 4 and to transversely extend a distance at least equal to or greater than the composite thickness of the strip 10 and dielectric sheets 12. For other capacitors which incorporate a plurality of dielectric sheets the transverse extent of the projecting lugs 20, 22 should be sufficient to be equal to or slightly greater than the composite thickness of the outer dielectric sheets and all electrode and other elements disposed intermediate thereof.

The utilization of projecting lugs or ears so sized and spaced on the casing member 16 results in an effective shrouding of those extending portions of the dielectric sheets that are normally subject to forces that would result in breakage or other damage thereto. By utilization of the above described general configuration of conducting casing member, with the particular size and spacing of the projecting lugs thereof being determined in accordance with the dimensions of the particular stack of interleaved planar dielectric and conducting elements, adequate protection of the extending portions of the dielectric members is obtained with no appreciable increase of manufacturing cost.

Having thus described my invention, I claim:

1. A capacitor structure comprising a stack of interleaved conducting and dielectric elements of planar character of predetermined thickness with said dielectric elements being sized to longitudinally extend beyond said conducting elements and defining the overall length and width of said stack a metallic casing member of a width less than the length of said dielectric elements deformably wrapped into surrounding compressive clamping relationship with said stack transverse to the longitudinal axis thereof and integral projecting members extending transversely to the length of said casing member, said projecting members being spaced to be disposed closely adjacent to and substantially parallel with the thickness defining side portions of the stack disposed parallel to the longitudinal axis thereof and sized to extend beyond the extremities of said dielectric elements when said casing is deformed around said stack to protect said extending portions of said dielectric elements from damage.

2. A capacitor structure comprising a relatively thin rectangularly shaped stack of interleaved planar conducting and dielectric elements with the latter extending beyond the former and defining the overall length and width of said stack, an elongate metallic casing member of a width less than the length of said stack deformably wrapped into surrounding compressive clamping relationship therewith with its long dimension disposed transverse to the length of said stack, said casing member including integral projecting means extending transversely of the length of said casing member and spaced to be disposed closely adjacent to and substantially parallel with the thickness defining side portions of said stack when said casing member is deformed thereabout and sized to extend beyond the extremities of the dielectric elements included in said encased stack to protect the corners thereof from damage.

References Cited in the file of this patent

UNITED STATES PATENTS

| | | |
|---|---|---|
| 1,579,168 | Vawter | Mar. 30, 1926 |
| 1,639,597 | Dubilier | Aug. 16, 1927 |